(12) United States Patent
Klippstein et al.

(10) Patent No.: US 10,768,355 B2
(45) Date of Patent: Sep. 8, 2020

(54) SCREEN FOR A FREE AND A RESTRICTED VIEWING MODE AND APPLICATION THEREOF

(71) Applicant: siOPTICA GmbH, Jena (DE)

(72) Inventors: Markus Klippstein, Jena (DE); Jürgen Schwarz, Apolda (DE); Ambrose Peter Nari, Jena (DE); Uwe Schröter, Dornburg-Camburg (DE); Stepan Alkhimenko, Jena (DE); Uwe Jahrmarkt, Jena (DE)

(73) Assignee: siOPTICA GmbH, Jena (DE)

( * ) Notice: Subject to any disclaimer, the term of this patent is extended or adjusted under 35 U.S.C. 154(b) by 0 days.

(21) Appl. No.: 16/484,973

(22) PCT Filed: Aug. 10, 2018

(86) PCT No.: PCT/EP2018/071765
§ 371 (c)(1),
(2) Date: Aug. 9, 2019

(87) PCT Pub. No.: WO2019/034557
PCT Pub. Date: Feb. 21, 2019

(65) Prior Publication Data
US 2020/0003946 A1    Jan. 2, 2020

(30) Foreign Application Priority Data

Aug. 14, 2017 (DE) ........................ 10 2017 007 669

(51) Int. Cl.
*G02F 1/13357* (2006.01)
*F21V 8/00* (2006.01)
*G02F 1/13* (2006.01)

(52) U.S. Cl.
CPC ......... *G02B 6/0035* (2013.01); *G02B 6/0073* (2013.01); *G02F 1/1323* (2013.01);
(Continued)

(58) Field of Classification Search
CPC .. G02B 6/0076; G02B 6/0078; G02B 6/0075; G02F 2001/133616; G02F 1/1323
See application file for complete search history.

(56) References Cited

U.S. PATENT DOCUMENTS 5,993,940 A    11/1999  Ouderkirk et al.
6,608,614 B1   8/2003   Johnson
(Continued)

FOREIGN PATENT DOCUMENTS

CN    205670225 U    11/2016
CN    206057756 U    3/2017
(Continued)

*Primary Examiner* — Julie A Bannan
(74) *Attorney, Agent, or Firm* — Christensen, Fonder, Dardi & Herbert PLLC

(57) ABSTRACT

A display screen operable on at least a partial area A in two operating modes, free-viewing mode B1, and restricted-viewing modeB2, with the residual display area of the screen outside the area A maintaining a free viewing mode; comprising a first backlight arranged below the residual display area; a second backlight arranged below the area A; a transmissive image generator in front of the backlights; a plate-shaped transparent light guide arranged between the image generator and the backlights that outcouples, through one of its large surfaces, light coupled in through one of its edges; light sources arranged laterally an edge of the light guide, wherein the light guide is transparent to at least 70% of the light emitted by the backlights, and wherein in the B1 mode, the light sources are switched on, and in the B2 mode, the backlights are on and the light sources are off.

17 Claims, 3 Drawing Sheets

(52) U.S. Cl.
CPC .. *G02F 1/133615* (2013.01); *G02F 1/133621* (2013.01); *B60K 2370/1523* (2019.05); *B60K 2370/25* (2019.05); *G02F 2001/133607* (2013.01); *G02F 2001/133626* (2013.01)

(56) References Cited

U.S. PATENT DOCUMENTS

| | | | |
|---|---|---|---|
| 6,765,550 B2 | 7/2004 | Janick et al. | |
| 7,303,322 B2 | 12/2007 | Lamb et al. | |
| 7,430,028 B2 | 9/2008 | Tsai et al. | |
| 7,534,026 B2 | 5/2009 | Uehara et al. | |
| 7,683,867 B2 | 3/2010 | Inoue et al. | |
| 7,974,506 B2 | 7/2011 | Wittenberg et al. | |
| 8,928,555 B2 | 1/2015 | Want et al. | |
| 9,881,531 B2 | 1/2018 | Klippstein et al. | |
| 10,036,846 B2 | 7/2018 | Lee et al. | |
| 10,181,306 B2 | 1/2019 | Chang et al. | |
| 10,310,302 B2 | 6/2019 | Klippstein et al. | |
| 10,408,992 B2 | 9/2019 | Woodgate et al. | |
| 2004/0239580 A1* | 12/2004 | Nagatani | G02B 6/0076 345/1.3 |
| 2007/0030240 A1 | 2/2007 | Sumiyoshi et al. | |
| 2008/0002430 A1* | 1/2008 | Kanade | G02B 6/0041 362/613 |
| 2008/0112187 A1* | 5/2008 | Katsumata | G02B 6/0068 362/611 |
| 2009/0067156 A1* | 3/2009 | Bonnett | G02B 6/0068 362/97.2 |
| 2012/0235891 A1 | 9/2012 | Nishitani et al. | |
| 2013/0162924 A1 | 6/2013 | Sahouani et al. | |
| 2013/0308185 A1 | 11/2013 | Robinson et al. | |
| 2013/0322114 A1 | 12/2013 | Nishitani et al. | |
| 2017/0261672 A1 | 9/2017 | Liu et al. | |
| 2017/0336661 A1 | 11/2017 | Harrold et al. | |
| 2018/0059308 A1 | 3/2018 | Li | |
| 2018/0267344 A1 | 9/2018 | Wu | |

FOREIGN PATENT DOCUMENTS

| | | |
|---|---|---|
| CN | 206163104 U | 5/2017 |
| CN | 107734118 A | 2/2018 |
| DE | 10 2015 016 134 B3 | 12/2016 |
| EP | 3 115 839 B1 | 3/2019 |
| EP | 3 244 256 B9 | 7/2019 |
| EP | 3 511 616 A1 | 7/2019 |
| GB | 2 428 128 A | 1/2007 |
| JP | 2007-155783 A | 6/2007 |
| TW | 201239471 A1 | 10/2012 |
| WO | WO 2005/071449 A2 | 8/2005 |
| WO | WO 2007/100458 A1 | 9/2007 |
| WO | WO 2007/140345 A2 | 12/2007 |
| WO | WO 2011/124599 A1 | 10/2011 |
| WO | WO 2012/033583 A1 | 3/2012 |
| WO | WO 2013/173483 A1 | 11/2013 |
| WO | WO 2015/121398 A1 | 8/2015 |
| WO | WO 2016/160048 A1 | 10/2016 |
| WO | WO 2017/027618 A1 | 2/2017 |
| WO | WO 2017/065745 A1 | 4/2017 |
| WO | WO 2018/141823 A1 | 8/2018 |
| WO | WO 2018/182991 A1 | 10/2018 |

\* cited by examiner

SCREEN FOR A FREE AND A RESTRICTED VIEWING MODE AND APPLICATION THEREOF

PRIORITY CLAIM

The present application is a National Phase entry of PCT Application No. PCT/EP2018/071765, filed Aug. 10, 2018, which claims priority from German Patent Application 10 2017 007 669.3, filed Aug. 14, 2017, the disclosures of which are hereby incorporated by reference herein in their entirety.

FIELD OF THE INVENTION

In recent years, great strides have been made in enlarging the visual angle of LCDs. Frequently, however, there are situations in which such a very large angular viewing range of a display screen can be a disadvantage. Increasingly, information such as banking data or other private particulars and sensitive data is becoming available on mobile devices such as notebooks and tablet PCs. Accordingly, users require some control of who is allowed to see such sensitive data; they must be able to choose between a wide viewing angle in order to share displayed information with others, e.g., when looking at vacation snaps or reading advertisements, and, on the other hand, a narrow viewing angle needed to keep displayed information private.

A similar problem is encountered in vehicle manufacturing: Here, when the motor is running, the driver must not be distracted by image contents such as digital entertainment shows, whereas a front-seat passenger would like to watch them during the ride. This requires a display screen that can be switched between corresponding display modes.

DESCRIPTION OF THE PRIOR ART

Accessory films based on micro-louvers have already been used on mobile display screens to provide optical data protection in what is known as a privacy mode. However, such films are not capable of being switched between modes but have to be applied and removed manually. Also, they have to be carried separately from the display screen when not in use. Another substantial disadvantage is the light loss accompanying the use of such louver films U.S. Pat. No. 6,765,550 B2 describes such privacy protection provided by micro-louvers. Here, the biggest disadvantages are the need to mechanically attach or remove the filter, and the light loss in the protected mode.

U.S. Pat. No. 5,993,940 A describes the use of a film the surface of which is provided with small, regularly arranged prismatic strips to create a privacy mode. The development and fabrication of this film are quite complicated.

In WO 2012/033583 A1, switching between free and restricted viewing is effected by the triggering of liquid crystals arranged between so-called "chromonic" layers. This involves a light loss, and implementation is rather complicated, too.

U.S. 2009/0067156 A1 discloses a great number of ideas to configure an illuminating system and a display device. In particular, the version illustrated there in FIGS. 3A and 3B uses two backlights consisting of wedge-shaped light guides, and an LCD panel, where the posterior backlight 40 is intended to positively create a wide illuminating angle, and the anterior backlight 38 is intended to positively create a narrow illuminating angle. It remains unclear, however, in what manner the backlight 38 is meant to create a narrow illuminating angle without converting the light having a wide illuminating angle, originating from backlight 40, essentially into light having a narrow illuminating angle when it passes backlight 38.

Regarding the configuration shown in FIG. 5 of U.S. 2009/0067156 A1, it should be noted that the two light guides 46 and 48 each produce "narrow light", i.e. light with a narrow illuminating angle. Conversion of the light in light guide 48 into "wide light", i.e. light with a wide illuminating angle, is only achieved by means of a partial mirror 50, which has to be provided with prism structures in a complex process. This conversion extremely diminishes the light intensity, because the light that at first exits in a narrow illuminating angle (the only light available) is then spread out into a wide illuminating angle, as a rule into the semispace. As a result, the brightness will be reduced by a factor of 5 or higher (as regards luminance), depending on the parameters. Thus, this configuration is of little practical relevance.

In the embodiment according to FIG. 7 of U.S. 2009/0067156 A1, a phosphorus layer that converts UV light into visible light is an absolute must. This is rather laborious to do; and given the aim to get sufficient light from the backlight to illuminate an LCD so that it can be read, one needs very high UV intensities. Therefore, this configuration is expensive and complicated; shielding off the UV radiation alone makes it impracticable.

U.S. 2012/0235891 A1 describes a highly complex backlight in a display screen. According to FIGS. 1 and 15, this design employs not only several light guides but also other complex optical elements such as microlens elements 40 and prism structures 50, which convert the light coming from the posterior illumination on the way to the anterior illumination. This is expensive and complicated to implement, and it involves a light loss. According to the version shown in FIG. 17 in U.S. 2012/0235891 A1, both light sources 4R and 18 produce light having a narrow illuminating angle, with the light radiated by the posterior light source 18 first being laboriously converted into light with a large illuminating angle. This complex conversion greatly diminishes brightness, as noted already above.

According to JP 2007-155783 A, special optical surfaces 19 that are difficult to compute and to manufacture are used to deflect light into varied narrow or broad regions depending on the light incidence angle. These structures are similar to Fresnel lenses. Furthermore, there exist inactive edges, which deflect light into unwanted directions. Thus, it remains uncertain whether really useful light distributions can be achieved.

For achieving restricted vision as taught by GB 2428128 A, additional light sources, which are arranged at a conspicuous distance from the display screen and illuminate a hologram attached to the display screen, are used to overlay the lateral view with special wavelengths. The disadvantages here are the necessary spacing of the light sources from the display screen, and the complexity of making suitable holograms.

U.S. 2013/0308185 A1 describes a special light guide provided with steps, which radiates light on a large area into various directions, depending on the direction in which it is illuminated from an edge. In interaction with a transmissive imager, e.g., an LC display, a display screen that is switchable between a free and a restricted viewing mode can be produced. Here, a disadvantage, among others, is that the restricted view effect can only be created either for a left/right or a top/bottom direction, but not for left/right and top/bottom directions simultaneously as needed for certain payment actions. In addition, some residual light is still visible from blocked viewing angles even in the restricted viewing mode.

In WO 2015/121398, the applicant discloses a switchable illuminating apparatus and its application. This technology, however, does not disclose any possible way to switch only part of the display screen between a free and a restricted viewing mode.

U.S. Pat. No. 6,608,614 B1 describes an LED-based backlight with an extended color space, wherein a variable color mix for a backlight is achieved through an optical element into which light of LEDs of various color values is coupled. However, the document does not disclose any teaching of how to switch between a free and a restricted viewing mode, and, especially, how to effect such switching of part of the display screen.

WO 2011/124599 A1 discloses an arrangement for light output comprising several light sources and a transparent light emission element. Here again, varied light is mixed in an optical element. That document, too, lacks any teaching of how to switch between a free and a restricted viewing mode, and, especially, how to effect such switching of part of the display screen.

In DE 10 2015 016 134 B3, finally, the present applicant discloses a display screen and a method for a free and a restricted viewing mode. Here, switching between the viewing modes is accomplished by blanketing the image at the restricted angles, rather than varying the backlight, which would make part of the display screen switchable.

The methods and arrangements mentioned above have, as a rule, the common disadvantages that they distinctly reduce the brightness of the basic display screen, and/or require an active, but at least a special, optical element for switching between the modes, and/or are complicated and expensive to fabricate, and/or degrade resolution in the free viewing mode. Especially, none of the embodiments known is capable of switching only part of the display screen between a private and a public viewing mode, except with a highly complex configuration.

SUMMARY OF THE INVENTION

Departing therefrom, the problem of the invention is to describe a display screen by which private presentation of information can be implemented by way of an optionally restricted viewing angle, with a second operating mode enabling free vision with a viewing angle that is as unrestricted as possible. In particular, it should be possible to switch merely part of the display area of the display screen. Moreover, the invention is intended to be implementable by simple means and as low-prized as possible. In both operating modes, the highest possible resolution is to be visible, with particular preference of the native resolution of the display screen used. Further, the invented solution is to cause the least possible light loss.

According to the invention, this problem is solved by a display screen that can be operated in two operating modes, viz B1 for a free viewing mode and B2 for a restricted viewing mode, on at least a partial area A of its display area (with the partial area A being a genuine partial area, i.e. smaller than, rather than equal to, the total display area of the display screen), wherein the residual display area of the display screen outside the partial area A permanently maintains a free viewing mode, comprising a first backlight of planar extension that radiates light in a non-restricted angular range and is, for the greater part, arranged below the residual display area outside the said partial area A, at least one second or further backlight of planar extension that radiates light in a restricted angular range and is, for the greater part, arranged below the said partial area A, a transmissive image generator arranged in front of the backlights (as seen in the viewing direction), e.g. an LCD panel, a plate-shaped transparent light guide disposed between the image generator and the backlights, this light guide being designed in such a way that it outcouples, through at least one of its large surfaces, light fed through at least one of its narrow sides (edges), light sources arranged laterally on at least one of the edges of the light guide, with the light guide being transparent to at least 70%, preferably at least 85%, of the light emitted by the backlights, wherein in mode B1 at least the light sources are switched on, and in mode B2 the backlights are switched on and the light sources are switched off.

The said restricted angular range may be configured symmetrically or asymmetrically about the vertical bisector of the image generator.

The second backlight is, for the greater part, arranged below the at least one partial area A, whereas the first backlight is, for the greater part, arranged below the residual display area, outside the at least one partial area A that can be operated in two operating modes. "For the greater part" means, as a rule, more than 90%, or, in most cases, even more than 95%, because feasible applications include cases—for example, oblique viewing of a display installed in a vehicle by the driver and a front-seat passenger—where a slight overlap between the first and the second backlight may be of advantage, or the common boundaries of the backlights are displaced. This applies analogously to screens possibly having several partial areas A1, A2, . . . .

The said light guide is preferably at least of the same size as the entire display area.

It is advantageous if the light guide has, on at least a partial surface area equal to that of the partial area A, but preferably on its full surface, an average haze value below 7%, or preferably below 2%, or, with particular preference, below 1%, measured according to ASTM D1003. That way, at least in mode B2, the light emitted by the second backlight in a restricted angular range is but slightly scattered when it passes the light guide, i.e. the focusing effected on the partial surface A for the B2 mode is almost not, or virtually not, cancelled by scattering in the light guide, this exactly being desired and necessary.

The light guide may consist of some thermoplastic or thermoelastic material or of glass. The light guide or its substrate may, for example, contain at least 40 wt.-%, or preferably 60 wt.-%, of polymethylmethacrylate, related to its weight. Alternatively, the material contained may be polycarbonate (PC) or PET, e.g. Other configurations are possible as well.

Advantageously, the light guide is, on at least one of its large surfaces and/or within its volume, provided with outcoupling elements for the outcoupling of light. Preferably but not necessarily, these are distributed over at least one of the large surfaces of the light guide and/or within its volume in such a way that outcoupling from the light guide of at least 80% of the light emitted by the light sources is effected on (only) one of the large surfaces of the light source.

The outcoupling of at least 80% of the light emitted by the light sources from one of the large surfaces of the light guide inherently means that maximally 20% of all the light outcoupled is outcoupled from the respective other large surface. This fact not necessarily means that in every case more than 80% of the light emitted by the light sources and coupled into the light guide is outcoupled from the one large surface, but related to more than 80% of the total quantity of light outcoupled by both large surfaces together. This clarification is necessary, since, due to losses, it is never the total light fed to the light guide that is outcoupled through the large surfaces. However, in advantageous embodiments of the invention it is actually possible, though not a necessary condition, that more than 80% of the light fed into the light guide by the light sources is outcoupled through a large surface in a planar fashion.

The outcoupling elements may be, e.g., microlenses and/or microprisms and/or diffractive structures and/or structural elements and have maximum dimensions of 100 μm, but preferably between 1 μm and 15 μm. Diffractive structures employed may be a hologram or a grating/diffraction grating. The structural elements may have a three-dimensional extension, e.g. be of a prismatic shape.

Thus, if they are provided on at least one of the large surfaces of the light guide, the outcoupling elements are advantageously formed from some plastic structured by means of a tool. This is possible in mass production, e.g., by applying a UV-curing material (e.g., a lacquer or varnish, a monomer, etc.) onto a light guide substrate, structuring the said material by means of a tool and curing it by UV radiation, e.g., polymerization. Other materials curable by radiation may also be used. In that way, e.g., grating structures, microprisms or microlenses (convex, with the plastic parts protruding from the surface and/or concave (embossed or recessed within the surface layer of the structured plastic) can be mass-produced at low cost.

Alternatively, the outcoupling elements may consist, e.g., of nanoparticles, titanium dioxide, barium sulfate, silsesquioxane particles and/or cross-linked polystyrene particles of a mean particle size of 150-500 nm, which are used in a concentration, relative to the weight of the light guide, of 0.01-300 wt.-ppm (ppm=parts per million, related to the weight).

It is further possible that

The light guide consists of a matrix plastic A and, homogeneously distributed therein, outcoupling elements of a polymerizate B, The share of the outcoupling elements consisting of polymerizate B amounts to 0.01 to 3 wt.-% relative to the matrix plastic A, and The refractive index nD(B) of the polymerizate B is above the refractive index nD(A) of the matrix plastic A by at least 0.01 units.

The first backlight in a display screen according to the invention may consist, e.g., of a planar emitter, preferably a light guide with light sources arranged laterally or on the rear side, at least one diffuser arranged in front of the planar emitter (seen in viewing direction), and optionally, further optical coatings arranged in front of the planar emitter (seen in viewing direction), such as, e.g., a BEF coating, a DBEF coating, and/or a neutral filter for attenuating the light intensity.

The neutral filter serves for the defined, essentially wavelength-independent attenuation of the light intensity. This is helpful to make the brightnesses perceived in the partial area A and its complementary display areas homogeneous or equally bright, and to avoid, or at least reduce, any visible transitions between the two backlights in viewing the image.

The first backlight in a display screen according to the invention may consist, for example, of a planar emitter, preferably a light guide with light sources arranged laterally or on the rear side, at least one diffuser arranged in front of the planar emitter (in viewing direction), at least one light collimator arranged in front of the planar emitter (in viewing direction). Preferably, one can use even two light collimators, e.g. in the form of prism arrays oriented at right angles with one another. The prism arrays may be, e.g., 3M™ Optical Lighting Film. In addition thereto, it is especially favorable to arrange a privacy filter in front of the prism array (in viewing direction), e.g. a microlouver filter such as the one offered by 3M™ under the Vikuiti™ trademark, or the VCF by Shin Etsu.

Both backlights preferably use a planar emitter in common.

Accordingly, the planar emitter can basically have a design similar to that of a backlight, being, for example, a side light, edgelight, direct LED backlight, edge LED backlight, OLED or some other planar emitter, on which the other components mentioned are applied.

It is further possible to for the second backlight to be a directed backlight.

Furthermore, the top surface of the image generator and/or at least one of the large surfaces of the light guide may be provided with means that reduce reflections, e.g., an antiglare or antireflection coating.

Finally it is possible to provide more than one partial surface A on which the said switching between the operating modes B1 and B2 can be done. In addition, further backlights may be provided.

A display screen according to the invention may be used, e.g., in a vehicle for displaying image content optionally on the partial area A to the front-seat passenger only in B1 mode, or simultaneously for driver and front-seat passenger in B1 mode, whereas the partial area(s) complementary to the partial area A of the display screen's display area are permanently visible to driver and front-seat passenger. Thus, it is possible to display, e.g., visual entertainment data such as digital TV, videos or Internet data can be presented on partial area A without offering them visually to the driver. This helps compliance with regulations for preventing distraction of the driver from his driving tasks. The display area complementary to the partial area A can display contents relevant for the driver, such as navigation images and texts, operating interfaces for the radio, air conditioning or the like.

A display screen according to the invention can just as well be used for entering or displaying confidential data, e.g., PINs, e-mails. SMSs or passwords at ATM machines, payment terminals or mobile devices. Many other applications are feasible.

In another favorable embodiment of the invention, in mode B1, as a function of specified limiting angles $\sigma$, $\gamma$, the outcoupled light exiting from the light guide at an angle $\beta$ will, at every point of the light guide surface in angular ranges satisfying the conditions of $80°>\beta>\gamma$ and/or $-80°<\beta<-\sigma$, with $10°<\gamma<80°$ and $10°<\sigma<80°$ and preferably with $\gamma=\sigma=40°$ or $\gamma=\sigma=20°$, measured normal to the light guide surface and in at least one of the two preferred directions, have maximally 80%, preferably 60% or, with particular preference, maximally 50% of the light intensity of the light exiting from such a point of the light guide surface along the surface normal.

The two preferred directions are mutually perpendicular and lie in a plane on the light guide 3 or on the surface of the backlight 2. In operation, e.g. at a payment terminal or in a motor vehicle, the display screen is fixed relative to its outer environment, and the preferred directions, irrespective of a portrait or landscape orientation of the display screen, can be assigned, e.g., the terms "vertical" and "horizontal", which actually relate to the outer coordinate system of the environment. "Vertical" corresponds to the top-to-bottom, and "horizontal" to the left-to-right direction on the display screen.

Often, the preferred direction selected is the vertical orientation. Without loss of generality, a negative angle is, in this case, assigned to the side on which the light is coupled in, an angle of −90° thus corresponding to a direction from which light is coupled in. The limiting angles σ, γ are firmly specified to in accordance with the optical performance desired for the respective application. In case of the preferred limiting angles γ=σ=40°, then, the luminous intensity condition applies only for angles between −40° and −80° and between 40° and 80°. The smaller the limiting angles σ, γ, the more the light in the respective preferred direction(s) is concentrated on the vertical bisector. In a car, for example, where in mode B1 the driver and the front-seat passenger look, with well definable viewing angles, at a display screen provided with the invented illuminating apparatus, the limiting angles σ, γ may rather be chosen to be smaller than 40°. In a laptop, by contrast, due to the hinged display screen and the universal using scenario regarding the viewing angles of different persons, limiting angles around 40° or larger may be useful. Possibly, the 80° limit may be 70°, instead.

Thereby, one achieves, e.g., a reduction of disturbing reflections in the windshield, especially in night-time driving, if the invented illuminating apparatus is installed in a vehicle. Furthermore, if the above-mentioned condition is satisfied, a distinct efficiency of outcoupling from the light guide is attained without the use of any focusing layers such as prism films or the like.

In all embodiments mentioned above, the said light sources may be LEDs or LED rows or laser diodes. Other versions are feasible and are within the scope of the invention.

Furthermore, the desired restricted angular ranges for a restricted view of the partial area A in mode B2 may be defined and implemented separately for the horizontal and vertical directions. In the vertical direction, for example, a larger angle than in the horizontal direction, or else no restriction at all, might be useful, say, if, at an ATM, persons of differing body heights are to see an image, whereas sideways viewing is to remain greatly or completely restricted. For POS payment terminals, on the other hand, safety regulations frequently necessitate viewing restrictions in mode B2 both in horizontal and vertical directions.

In a special embodiment, an additional light guide, which is provided with means for light outcoupling and into which light from additional light sources can be fed laterally, is arranged in front of the image generator (in viewing direction). This added light guide can be implemented, for example, with the same or similar means as the abovementioned light guide below the image generator. Here, in operating mode B1 for a free viewing mode, the additional light sources are switched off so that the entire image remains essentially uninfluenced by them. In mode B2, by contrast, if lateral viewing of the partial area A is markedly reduced, the additional light sources are switched on, so that the added light guide radiates light, preferably towards one side (left or right), or simultaneously toward the left and the right. This light will blanket any residual artefacts that may otherwise be visible on the partial area A from an angle outside the restricted angle.

Preferably, the added light guide and/or the additional light sources are configured in such a way that the said blanketing is effective essentially only above the partial area A. Due to this configuration, then, any unintentional residual light in mode B2 in angular ranges that are actually intended to be protected from viewing can be outshone to such an extent that no contrast is perceived on the partial area A and, thus, no image can be seen from the non-enabled angles.

The additional light sources eligible are adapted to radiate colored or white light, and they can radiate light of a color that is not present in the image displayed by the transmissive image generator.

Alternatively it is possible for the additional light sources to radiate light of a color that is present in the image displayed by the transmissive image generator or is close to such a color in the color spectrum. Finally, it is feasible for the additional light sources to radiate light of a color approximately corresponding to a color complementary to a color present in the image displayed by the transmissive image generator. "Colored light" is understood especially to be visible light that is not white, e.g. light of red, green, blue, turquoise, cyan, magenta or yellow color. Further, this light can optionally be radiated at various brightness levels. Moreover, it is possible for the chromatic properties, e.g. the color and/or brightness, of the light emitted by the additional light sources to be modulated in time. Also, the additional light sources may comprise different light sources, such as, e.g., RGB LEDs in LED rows radiating light of different colors and/or different brightnesses either simultaneously or at different times, and/or staggered.

On principle, the performance of this invention remains unaffected even if the parameters described above are varied within certain limits.

It is understood that the features mentioned before and those to be explained below are applicable not only in the combinations stated but also in other combinations or as stand-alone features without leaving the scope of the present invention.

BRIEF DESCRIPTION OF THE DRAWINGS

Below, the invention will be explained in more detail with reference to the accompanying drawings, which also show features essential to the invention, among others, and in which.

The drawings are not to scale and illustrate principles only.

DETAILED DESCRIPTION OF THE DRAWINGS

Figure 1:
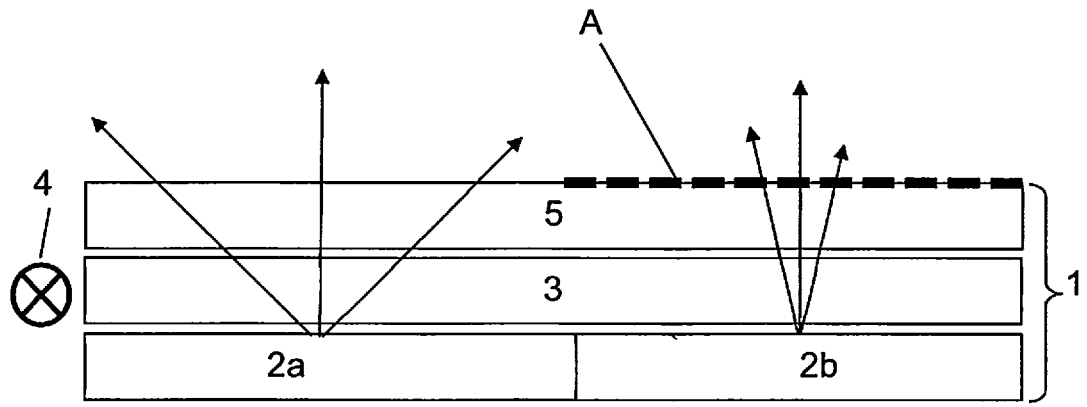
FIG. 1 is a sketch illustrating the principle of the invented display screen in the operating mode B2, with part of the display area being in a free viewing mode and another part of the display area being in a restricted viewing mode.

FIG. 1 is a sketch (sectional view) illustrating the principle of the invented display screen 1 in the operating mode B2, wherein a partial area A (marked by a bold dashed line and corresponding to about half the entire display area) of the display area is in a free viewing mode and another part of the display area is in a restricted viewing mode. This display screen 1 comprises
  A first backlight 2a of planar extension, which radiates light into a non-restricted angular range (the light being suggested by the rays emitted by the first backlight 2a in divergent directions), and is arranged, for the greater part, below the rest of the display area outside the said partial area A,
  at least a second backlight 2b of planar extension, which radiates light into a restricted angular range (the light being suggested by the rays emitted by the second backlight 2b in a narrow angular range), and is arranged, for the greater part, below the said partial area A,
  a transmissive image generator 5 arranged in front of the two backlights 2a, 2b (seen in viewing direction), e.g., an LCD panel,
  a plate-shaped transparent light guide 3 arranged between the image generator 5 and the two backlights 2a, 2b, which is designed in such a way that it outcouples, through at least one of its large surfaces, light that is coupled in at least through one of its edges,
  light sources 4, e.g. an LED row, arranged laterally on at least one edge of the light guide 3,
  wherein the light guide 3 is transparent to at least 70% of the light emitted by the n backlights 2a, 2b.

Figure 2:
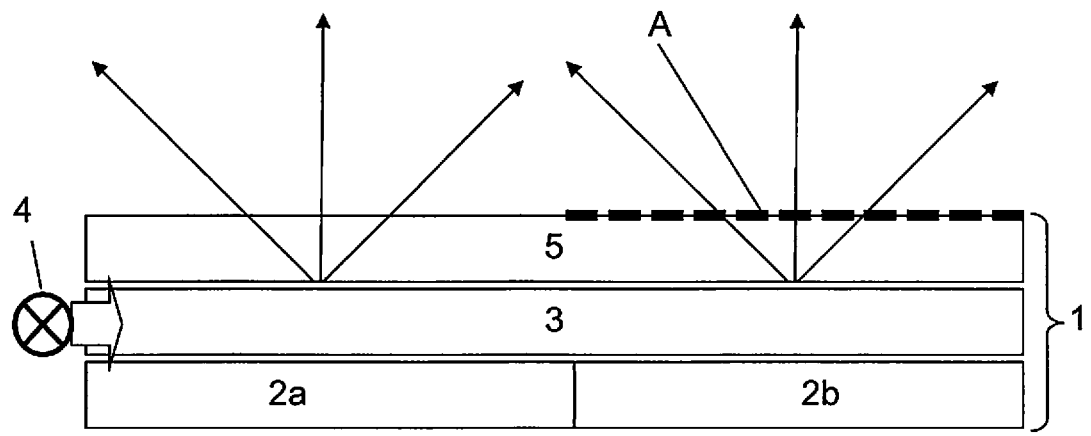
FIG. 2 is a sketch illustrating the principle of the invented display screen in the operating mode B1, with the entire display area being in a free viewing mode.

In the B2 mode shown in FIG. 1, the two backlights 2a, 2b are switched on, and the light sources 4 are switched off. Compared with this, FIG. 2 is a sketch illustrating the principle of the invented display screen in the B1 mode, wherein the entire display area is in a free viewing mode. For this, at least the light sources 4 are switched on. To obtain a particularly bright image through the restricted angular range, one can additionally switch on, e.g., the second backlight 2b. Independently of this, one can also switch on the first backlight 2a to obtain a particularly bright image outside the partial area A of the image generator 5.

The said restricted angular range may be arranged either symmetrically or asymmetrically relative to the surface normal of the image generator 5. With an asymmetric arrangement, the image in the B2 mode can be made well visible to a front-seat passenger who, due to his/her seated position, looks at the display screen 1 obliquely.

Advantageously, the light guide 3, on a partial area whose surface area is the same size as that of partial area A but preferably on its entire area, has an average haze value below 7%, preferably below 2%, or particularly preferably below 1%, measured according to ASTM D1003, whereby the light radiated by the backlight at least in B2 mode in a restricted angular range is only negligibly, if at all, scattered at angles outside the said angular range when it passes the light guide; i.e., the bundle of light formed on partial area A for the B2 mode is almost not, or virtually not, spread out again by scattering in the light guide 3, which is exactly what is desired and required.

The light guide 3 may consist of some thermoplastic or thermoelastic material or of glass. The light guide or its substrate may, for example, contain at least 40 wt.-%, or preferably 60 wt.-%, of polymethylmethacrylate, related to its weight. Alternatively, the material contained may be polycarbonate (PC) or PET, e.g. Other configurations are possible as well.

Advantageously, the light guide 3 has outcoupling elements 6 for the outcoupling of light disposed on at least one of its large surfaces and/or within its volume. Preferably, but not necessarily, these elements are distributed on at least one of the large surfaces and/or within the volume of the light guide 3 in such a way that at least 80% of the light originating from the light sources 4 is coupled out of the light guide 3 through one of its large surfaces.

Figure 3:
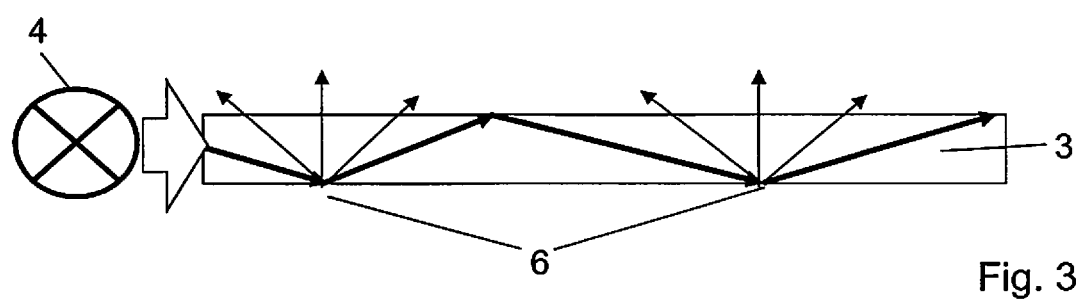
FIG. 3 is a sketch illustrating the principle of light laterally coupled into a light guide and outcoupled from the lower large surface of the light guide, on which the outcoupling elements are disposed.

FIG. 3 is a sketch illustrating the principle of light laterally coupled by light sources 4 into a light guide 3 and outcoupled from the lower large surface of the light guide 3, on which the outcoupling elements are disposed, wherein the light, while outcoupled from the bottom large surface of the light guide 3 (i.e., brought out of the angle of total reflection), actually leaves the light guide 3 through the complementary large surface (on the drawing: the top large surface). In the horizontal direction, i.e. normal to the plane of the drawing, the light here is typically coupled out in a wide angular range. The locus of the outcoupling elements 6 is indicated by reference number 6, but the outcoupling elements 6 proper are not shown, as they have to be of microscopic size.

Light, then, is coupled in laterally into light guide 3 by the light sources 4, e.g., by LEDs. Due to total reflection, rays of the coupled-in light (represented by bold rays) are reflected by the outer wall and thrown back into the light guide 3 until they finally (probably after repeated hits) hit an outcoupling element 6 to undergo the desired outcoupling. The outcoupling is represented by the thin rays. For better understanding, the representation in FIG. 3 is highly schematic; in reality, the light guide 3 implements a vast number of ray paths, and a vast number of outcoupling elements 6 are employed.

Figure 4:
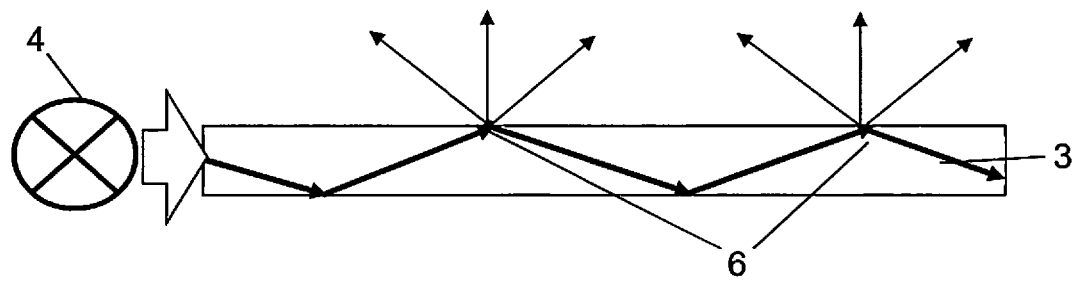
FIG. 4 is a sketch illustrating the principle of light laterally coupled into a light guide and outcoupled from the upper large surface of the light guide, on which the outcoupling elements are disposed.

By contrast, FIG. 4 is a sketch illustrating the principle of light laterally coupled by light sources 4 into a light guide 3 and outcoupled from the upper large surface of the light guide 3, on which the outcoupling elements 6 are disposed. Here, the expositions on FIG. 3 apply accordingly. What is technically different here is merely the location and possibly the configuration of the outcoupling elements 6, which now occupy the upper side of the light guide 3, thus outcoupling the light directly up without the need to cross the light guide 3 once again in order to exit from it as shown in FIG. 3.

Outcoupling at least 80% of the light emitted by the light sources 4 from one of the large surfaces of the light guide 3 inherently means that maximally 20% of the total light outcoupled is outcoupled from the respective other large surface. This fact does not necessarily mean that in any case more than 80% of the light coupled into the light guide 3 by the light sources 4 is coupled out through the one large surface, but refers to more than 80% of the total light coupled out. This clarification is necessary, since, due to losses, it is never the total light fed to the light guide 3 that is outcoupled through the large surfaces. However, in advantageous embodiments of the invention it is actually possible, though not a necessary condition, that more than 80% of the light fed into the light guide 3 by the light sources 4 is outcoupled through a large surface in a planar fashion.

The outcoupling elements 6 may consist, e.g., of microlenses and/or microprisms and/or diffractive structures and/or structural elements and have maximum dimensions of 100 µm, or preferably between 1 µm and 15 µm. The diffractive structures may, for example, be a hologram or a grating/diffraction grating. The structural elements may have a three-dimensional extension, e.g. a prism shape.

Thus, if they are provided on at least one of the large surfaces of the light guide 3, the outcoupling elements 6 are advantageously formed from some plastic structured by means of a tool. This is possible in mass production, e.g., by applying a UV-curing material (e.g., a lacquer or varnish, a monomer, etc.) onto a light guide substrate, structuring the said material by means of a tool and curing it by UV radiation, e.g., polymerization. Other materials curable by radiation may also be used.

In that way, e.g., grating structures, microprisms or microlenses (convex, with the plastic parts protruding from the surface and/or concave (embossed or recessed within the surface layer of the structured plastic) can be mass-produced at low cost.

Alternatively, the outcoupling elements 6 may consist, e.g., of nanoparticles, titanium dioxide, barium sulfate, silsesquioxane particles and/or cross-linked polystyrene particles of a mean particle size of 150-500 nm, which are employed in a concentration of 0.01-300 wt.-ppm (ppm=parts per million, referred to the weight of the light guide 3).

Figure 5:
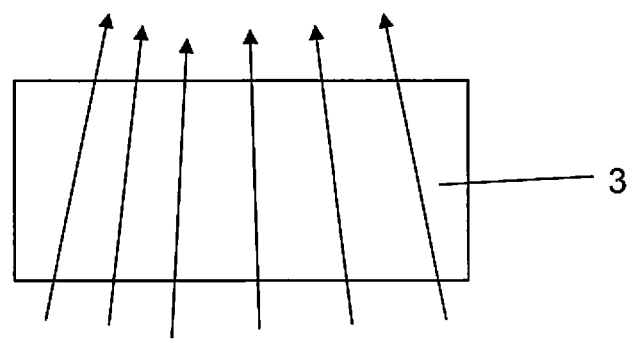
FIG. 5 is a sketch illustrating the principle of light emitted by a backlight passing a light guide.

It is further possible that
- the light guide 3 consists of a matrix plastic A and, homogeneously distributed therein, outcoupling elements 6 of a polymerizate B,
- the share of the outcoupling elements 6 consisting of polymerizate B amounts to 0.01 to 3 wt.-% relative to the matrix plastic A, and
- the refractive index nD(B) of the polymerizate B is above the refractive index nD(A) of the matrix plastic A by at least 0.01 units FIG. 5 is a sketch illustrating the principle of light originating, e.g., from a second backlight 2b passing a light guide 3 through both of its large surfaces, i.e. across its volume. Here, the outcoupling elements 6 play a part that is essentially negligible, because the light originates from the second backlight 2b, i.e., the light is not coupled into the light guide 3 laterally through an edge from light sources 4, and therefore it is not, or scarcely, deflected back and forth by total reflection in the light guide 3. Accordingly, the outcoupling elements 6 are not shown in the drawing, since their effect in this constellation is negligible.

Figure 6:
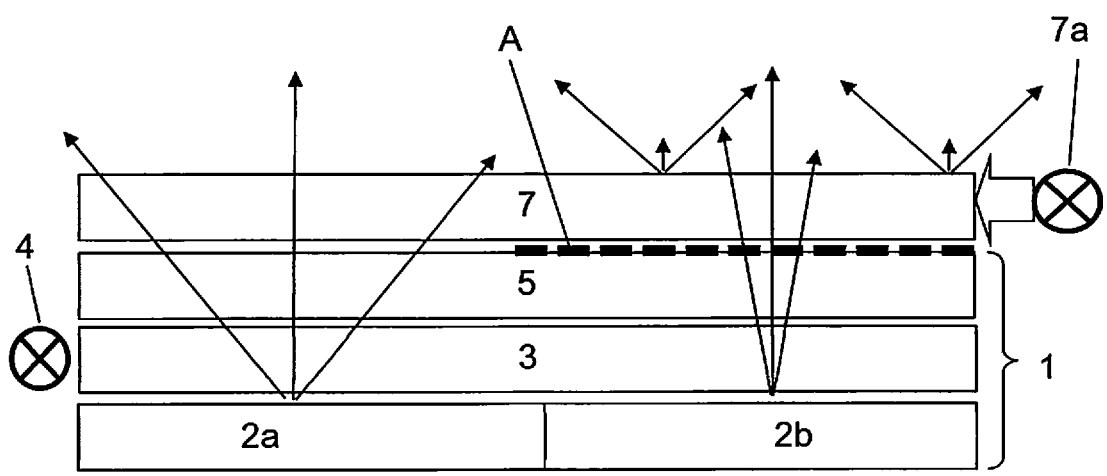
FIG. 6 is a sketch illustrating the principle of the invented display screen in the operating mode B2, with part of the display area being in a free viewing mode and another part of the display area being in a restricted viewing mode, and with an added light guide arranged in front of the image generator in order to blanket any residual light for a viewer looking sideways.

FIG. 6 is a sketch illustrating the principle of the invented display screen in the operating mode B2, with part of the display area being in a free viewing mode and a part A of the display area being in a restricted viewing mode (mode B2), and with an added light guide 7 being arranged in front of the image generator 5 in order to blanket any existing residual light in case of lateral viewing. In this special embodiment, an added light guide 7 with means (not shown in the drawing) for light outcoupling is arranged in front of the image generator 5 (seen in viewing direction). The added light guide can laterally be fed with light by additional light sources 7a. This added light guide 7 can be implemented below the image generator 5, e.g., with means equal or similar to those of the light guide 3.

Here, in mode B1 for a free viewing mode, the further light sources 7a are switched off, so that the entire image remains essentially unaffected by the further light guide 7. In mode B2, however, where lateral perceptibility on the partial area A is markedly reduced, the additional light sources 7a are switched on, whereby the added light guide 7 radiates light, preferably towards one side (left or right), or simultaneously toward the left and the right (or up and down) (as indicated in FIG. 6 by the long arrows pointing toward the left and the right; the narrow vertical arrow indicates that only the least possible amount of light is radiated in this direction for a slight influence on image quality in form of an—unwanted—contrast reduction). This light blankets any residual artefacts visible on the partial area A from a lateral angle outside the restricted angular range.

Preferably, the added light guide 7 and/or the additional light sources 7a are configured only to an extent needed to ensure this blanketing above the partial area A, as indicated in FIG. 6. By means of this configuration, then, any unintentional residual light in mode B2 present in the angular ranges actually protected from viewing can be outshone to such an extent that no contrast is perceived on the partial area A and, thus, no image can be seen from the non-enabled angles. The additional light sources 7a are designed to emit colored or white light, and they can emit light of a color that is not present in the image displayed by the transmissive image generator 5.

Alternatively, it is possible for the additional light sources 7a to emit light of a color that is present in the image displayed by the transmissive image generator 5 or is close to such a color in the color spectrum. Finally, it is feasible that the additional light sources 7a emit light of a color approximately corresponding to the color complementary to a color present in the image displayed by the transmissive image generator. The term "colored light" especially designates visible light that is not white, e.g., light of the colors red, green, blue, turquois, cyan, magenta or yellow. Further, this light may optionally be emitted at varied brightness levels. Also, it is possible to modulate the chromaticity, e.g., the color and/or brightness, of the light emitted by the light sources 7a in time. Moreover, the light sources 7a can be implemented with individual light sources 7a1, 7a2, ... of different kinds, such as RGB-LEDs in LED rows, that emit light of varied colors and/or brightness simultaneously or at temporal and/or spatial intervals.

Figure 7:
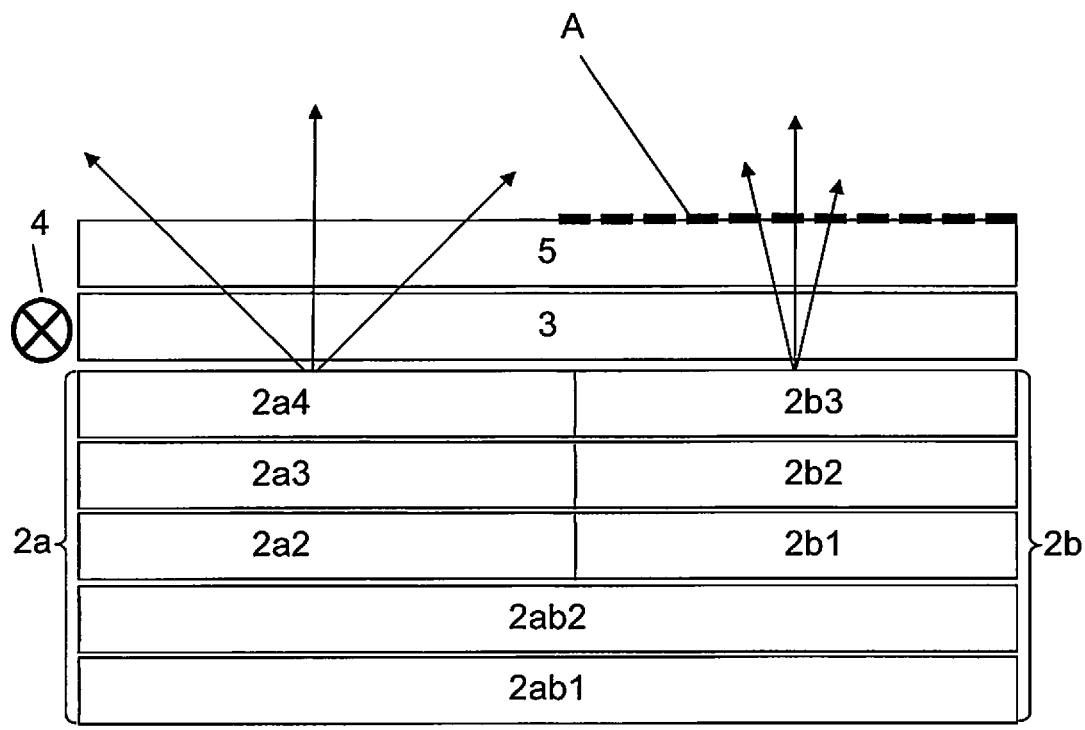
FIG. 7 is a sketch illustrating the principle of the invented display screen in the operating mode B2, with part of the display area being in a free viewing mode and another part of the display area being in a restricted viewing mode, showing the two backlights and their essential components.

FIG. 7 is a sketch illustrating the principle of the invented display screen in operating mode B2, with a part A of the display area being in a restricted viewing mode and the remaining part of the display area being in a free viewing mode, and with the two backlights 2a, 2b shown with their components.

In a display screen 1 according to the invention, the first backlight 2a shown may consist, e.g., of
- a planar emitter 2ab1, preferably a light guide with light sources arranged laterally or on the rear side, at least one diffuser 2*ab*2 arranged in front of the planar emitter 2*ab*1 (in viewing direction), and, optionally, further optical layers arranged in front of the planar emitter 2*ab*1 (in viewing direction), such as, e.g., a BEF layer 2*a*2, a DBEF layer 2*a*3 and/or a neutral filter 2*a*4 for attenuating the light intensity.

The neutral filter 2*a*4 serves for the defined, essentially wavelength-independent attenuation of the light intensity. This is helpful for attaining the best possible homogeneity of the brightnesses perceived in the partial area A and the display areas complementary to it.

In a display screen 1 according to the invention, the second backlight 2*a* shown in FIG. 7 may consist, e.g., of

- a planar emitter 2*ab*1, preferably a light guide with light sources arranged laterally or on the rear side,
- at least one diffuser 2*ab*2 arranged in front of the planar emitter 2*ab*1 (in viewing direction),
- two light collimators in the form of prism arrays 2*b*1, 2*b*2 arranged in front of the planar emitter at right angles with each other, wherein the prism arrays may consist, e.g., of 3M™ Optical Lighting Film,
- a privacy filter 2*b*3 arranged in front of the prism arrays (in viewing direction), e.g., a microlouver filter such as offered by 3M™ under the Vikuiti™ trademark or by Shin Etsu as VCF.

Both backlights 2*a*, 2*b* preferably use a planar emitter 2*ab*1 in common, as shown in FIG. 7. The diffuser 2*ab*2, too, can be used by both backlights 2*a*, 2*b*, if it is implemented as a single piece.

Accordingly, the planar emitter 2*ab*1 may basically be designed like a backlight, e.g., a sidelight, edgelight, direct LED backlight, edge LED backlight, OLED or other planar emitter, on which the other components mentioned are applied.

Further, the backlight 2*b* may also be a directed backlight.

Figure 8:
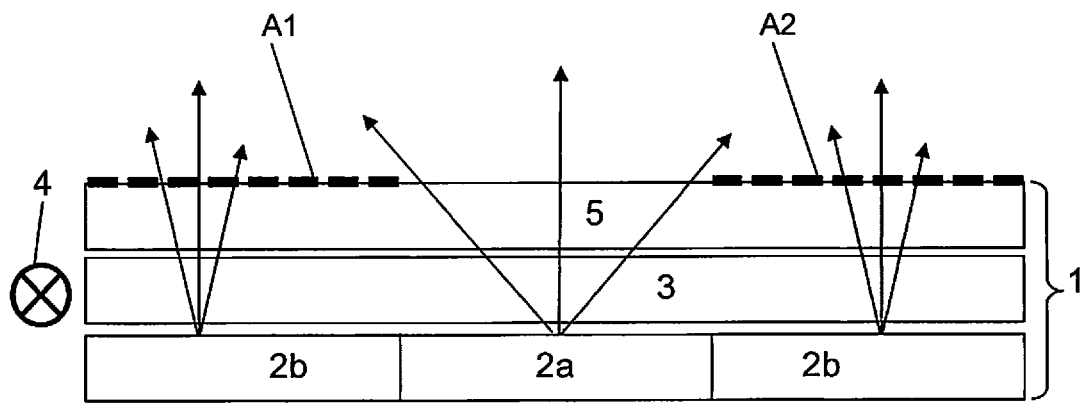
FIG. 8 is a sketch illustrating the principle of the invented display screen analogous to FIG. 1, but with several partial areas.

FIG. 8, finally, shows a modification of the display screen shown in FIG. 1 in B2 mode, wherein use is made not only of one partial area A, but of two partial areas A1 and A2 situated on the outer zones of the display screen surface, and wherein the display screen, in these two partial areas, can be operated in both the B1 and B2 modes, whereas the remaining display area of the display screen between the said two partial areas is permanently operated in the free viewing mode. Preferably, the operating mode B1 or B2 can be selected separately for either of the two partial areas A1 and A2. Also, the partial areas A1, A2 and, where provided, further partial areas may be arranged in such a way that the rest of the display screen is divided into several areas.

A display screen 1 according to the invention can be used, e.g., in a vehicle for the selective presentation of image contents on the partial area A either visible only to a front-seat passenger in B2 mode, or simultaneously to the driver and a front-seat passenger in B1 mode, whereas the partial display area(s) of the display screen 1 that is/are complementary to the partial area(s) A is/are permanently visible to the driver and the front-seat passenger. Thus, e.g., visual entertainment data such as digital TV, videos or Internet data can be presented to the front-seat passenger on the partial area A without presenting them visually to the driver. This helps compliance with regulations for preventing distraction of the driver from his driving tasks. A display screen according to the invention can just as well be used for entering or displaying confidential data, e.g., PINs, e-mails, SMSs or passwords at ATM machines, payment terminals or mobile devices. Many other applications are feasible.

In all embodiments described above, the said light sources may be LEDs or LED rows or laser diodes. Other versions are feasible and are within the scope of the invention.

Furthermore, the desired restricted angular ranges for a restricted view of the partial area A in mode B2 may be defined and implemented separately for the horizontal and vertical directions. In the vertical direction, for example, a larger angle than in the horizontal direction, or else no restriction at all, might be useful, say, if, at an ATM, persons of differing body heights are to see an image, whereas sideways viewing is to remain greatly or completely restricted. For POS payment terminals, on the other hand, safety regulations frequently necessitate viewing restrictions in mode B2 both in horizontal and vertical directions.

The invented display screen described above solves the problem of the invention: It permits well-implementable practical solutions providing the private-proof presentation of information by means of an optionally restricted viewing angle, whereas enabling free viewing without any restriction of the viewing angle in a separate operating mode. Switching the display screen between modes can also be selected to act on part of the display screen's display area only. The invention can be put into practice by simple means and at affordable cost. In both operating modes, the native resolution of the image display device employed can be utilized. Moreover, the solution causes but little light loss.

The invention described above can be used to advantage wherever confidential data are displayed and/or entered, such as in entering PINs or passwords, data display at ATMs or payment terminals, or reading e-mails on mobile devices. As also described above, the invention can also be used to advantage in cars.

LIST OF REFERENCE NUMBERS

A, A1, A2 partial area
1 display screen
2*a* backlight
2*b* backlight
2*ab*1 planar emitter
2*ab*2 diffuser
2*b*1 light collimator/prism array
2*b*2 light collimator/prism array
2*b*3 privacy filter/microlouver filter
2*a*2 BEF layer
2*a*3 DBEF layer
2*a*4 neutral filter for attenuating the light intensity
3 light guide
4 light sources
5 transmissive image generator
6 outcoupling elements
7 light guide
7*a* light sources

What is claimed is:

1. A display screen that on at least a partial area A of its display area can be operated in at least two operating modes, viz B1 for a free viewing mode and B2 for a restricted viewing mode, wherein a residual display area of the display screen outside the partial area A permanently maintains a free-viewing mode, comprising:

a first backlight of planar extension configured to radiate light in a non-restricted angular range and that, for the greater part, is arranged below the residual display area outside the partial area A, a second backlight of planar extension that radiates light in a restricted angular range and that, for the greater part, is arranged below the partial area A, a transmissive image generator arranged, in the viewing direction, in front of the two backlights, a plate-shaped transparent light guide that is located between the image generator and the two backlights and is provided on at least one of its large surfaces and/or within its volume with outcoupling elements for the outcoupling of light, so that it, through at least one large surface, outcouples light coupled in through at least one of its edges, light sources arranged laterally on at least one of the edges of the light guide, wherein the residual display area of the display screen outside the partial area A permanently maintains a free viewing mode, wherein the light guide is transparent to at least 70% of the light originating from the two backlights, and wherein in mode B1 at least the light sources are switched on, and wherein in mode B2 the first and second backlights are switched on and the light sources are switched off.

2. The display screen as claimed in claim 1, wherein the light guide, on at least a partial area having a surface area equal to that of the partial area A, has a haze value of less than 7%, measured according to ASTM D1003, whereby the light emitted by the backlight at least in mode B2 in a restricted angular range is only marginally scattered when it passes the light guide.

3. The display screen as claimed in claim 1, wherein the light guide consists of a thermoplastic or thermoelastic material or of glass.

4. The display screen as claimed in claim 1, wherein the outcoupling elements are distributed on at least one of the large surfaces and / or within the volume of the light guide are distributed in such a way that at least 80% of the light originating from the light sources is coupled out through one of the large surfaces of the light guide.

5. The display screen as claimed in claim 1, wherein the outcoupling elements microlenses and / or microprisms and / or diffractive structures and / or structural elements.

6. The display screen as claimed in claim 1, wherein the outcoupling elements consist of nanoparticles, titanium dioxide, barium sulfate, silsesquioxane particles and/or cross-linked polystyrene particles with a mean particle size of 150 to 500 nm, which are used in a concentration, related to the weight of the light guide, of 0.01 to 300 wt.-ppm (parts per million related to the weight).

7. The display screen as claimed in claim 1, wherein:
the light guide consists of a matrix plastic A and, homogeneously distributed therein, outcoupling elements consisting of a polymerizate B,
the share of the outcoupling elements consisting of polymerizate B is 0.01 to 3 wt.-% related to the matrix plastic A, and a refractive index nD(B) of the polymerizate B is higher than a refractive index nD(A) of the matrix plastic A by at least 0.01 units.

8. The display screen as claimed in claim 1, wherein the first backlight consists of:
a planar emitter, including a light guide with light sources arranged laterally or on the rear surface,
at least one diffuser arranged (as seen in the viewing direction) in front of the planar emitter, and optionally, additional optical layers arranged, as seen in the viewing direction, in front of the planar emitter.

9. The display screen as claimed in claim 1, wherein the second backlight consists of:
a planar emitter, including a light guide with light sources arranged laterally or on the rear surface,
at least one diffuser arranged, as seen in the viewing direction, in front of the planar emitter, and
at least one light collimator arranged as seen in the viewing direction, in front of the planar emitter.

10. The display screen as claimed in claim 1, wherein both the first and the second backlights use a planar emitter in common.

11. The display screen as claimed in claim 1, wherein mode B1, as a function of specified limiting angles $\sigma$, $\gamma$, the outcoupled light exiting from the light guide at an angle $\beta$ will, at every point of the light guide surface in angular ranges satisfying the conditions of $80°>\beta>\gamma$ and/or $-80°<-\sigma$, with $10°<\gamma<80°$ and $10°<\sigma<80°$, measured normal to the light guide surface and in at least one of two preferred directions, have maximally 80% or, with particular preference, maximally 50% of the light intensity of the light exiting from such a point of the light guide surface along the surface normal.

12. Use of the display screen as claimed in claim 1 in a vehicle for selectively displaying image contents on the partial area A for the front-seat passenger only in operating mode B2, and simultaneously for the driver and the front-seat passenger in operating mode B1, whereas the partial area of the display area of the display screen that is complementary to the partial area A is permanently visible to the driver and the front-seat passenger.

13. The display screen as claimed in claim 1, wherein the light guide on a full surface area has a haze value of less than 7%.

14. The display screen of claim 8, further comprising additional optical layers arranged, as seen in the viewing direction, in front of the planar emitter.

15. The display screen of claim 11, wherein $\gamma=\sigma=40°$.

16. The display screen of claim 11, wherein $\gamma=\sigma=20°$.

17. The display screen as claimed in claim 14, wherein the additional optical layers are configured as a BEF layer, a DBEF layer and/or as a neutral filter for attenuating the light intensity.

* * * * *

UNITED STATES PATENT AND TRADEMARK OFFICE
CERTIFICATE OF CORRECTION

PATENT NO. : 10,768,355 B2
APPLICATION NO. : 16/484973
DATED : September 8, 2020
INVENTOR(S) : Markus Klippstein et al.

It is certified that error appears in the above-identified patent and that said Letters Patent is hereby corrected as shown below:

On the Title Page

Column 2, Item (57), under "ABSTRACT", Line 3, delete "modeB2," and insert -- mode B2, --, therefor.

In the Drawings

On Sheet 2 of 3, delete "Fig 5" and insert -- Fig. 5 --, therefor.

On Sheet 3 of 3, delete "Fig 7" and insert -- Fig. 7 --, therefor.

In the Specification

In Column 1, Line 45, delete "films" and insert -- films. --, therefor.

In Column 9, Line 14, delete "components," and insert -- components; --, therefor.

In Column 11, Line 22, delete "e.g." and insert "e.g.," at each occurrence throughout the Patent.

In Column 11, Line 53, delete "units" and insert -- units. --, therefor.

In Column 11, Line 56, delete "i.e." and insert "i.e.," at each occurrence throughout the Patent.

In the Claims

In Column 15, Claim 4, Line 34, delete "and / or" and insert -- and/or --, therefor.

In Column 15, Claim 5, Line 39, delete "and / or" and insert -- and/or --, therefor.

In Column 15, Claim 5, Lines 39-40, delete "and / or" and insert -- and/or --, therefor.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,768,355 B2

In Column 15, Claim 5, Line 40, delete "and / or" and insert -- and/or --, therefor.

In Column 16, Claim 11, Lines 26-27, delete "-80°<-σ," and insert -- -80°<β<-σ, --, therefor.